UNITED STATES PATENT OFFICE.

THOMAS FLETCHER, OF WARRINGTON, ENGLAND, ASSIGNOR TO GEORGE B. SNOW, THEODORE G. LEWIS, AND JOHN E. ROBIE.

IMPROVEMENT IN PREPARING FIRE-CLAY FOR FURNACES, CRUCIBLES, FIRE-BRICKS, &c.

Specification forming part of Letters Patent No. 208,302, dated September 24, 1878; application filed May 10, 1878.

*To all whom it may concern:*

Be it known that I, THOMAS FLETCHER, of Warrington, Lancashire, England, have invented a new and useful Process for Preparing Fire-Clay, which process is fully set forth in the following specification:

This invention relates to a process for preparing fire-clay, by which any required degree of lightness and porosity may be produced in the articles which are manufactured therefrom, the object being to increase its efficiency as a non-conductor of heat, thus economizing the fuel required to produce the desired temperature in certain forms of furnaces. This is done by incorporating with the raw powdered clay a large proportion of combustible matter in a state of fine division, which, when the clay is burned, will be volatilized, thus rendering the mass of clay porous.

The non-conducting powers of fire-clay may be so much increased by the above treatment that brass may be melted in a furnace constructed by my method without the exterior of the furnace coming to a greater heat than can be easily borne by the hand, even though the walls thereof be not more than an inch in thickness.

I take of dry powdered fire-clay as usually prepared for use one part, by measure, and mix with it intimately from three to six parts of finely-divided combustible matter—as, for instance, sawdust, which I prefer on account of its cheapness. The proportions of the mixture vary as above, according to the amount of strength or lightness and non-conducting power desired in the article to be made.

I am aware that a certain proportion of the above addition has been made to fire-clay, and the mixture wet up and molded into shape in the ordinary way; but a mixture of the proportions given above would prove intractable under the usual treatment. I therefore, instead of water, use some more viscid or glutinous liquid—as, for instance, flour-paste, boiled starch, the sirup of grape-sugar, or tar—which will serve as examples of the substances which are capable of producing the effect I desire, that of binding the particles of the above-named mixture into a plastic mass.

The mixture should be thoroughly worked in a pug-mill, if possible, to produce an intimate commingling of the different ingredients, and then rammed into a suitable mold to produce an article of the shape desired, which is slowly dried and burned at a temperature about equal to that of melted cast-iron until it will ring when struck.

It is evident that the sawdust or other equivalent matter which was mixed with the clay will be burned and dissipated in vapor, each particle leaving a small vacuity in the substance of the clay, which is thus rendered light and porous and an extremely perfect non-conductor of heat. By this process a furnace may be constructed, using ordinary illuminating-gas as a fuel, in which steel can be melted, or a Hessian crucible softened and fused by the heat produced, while if the sides of the furnace are an inch thick its exterior will scarcely become warm enough to burn the hand.

Having thus described my improved process for producing non-conducting fire-clay, I claim—

The above-described process for producing a non-conducting fire-clay, to wit: by mixing with the clay a large proportion of sawdust, or its equivalent, and rendering the mass coherent by a glutinous liquid, substantially as described.

THOS. FLETCHER.

Witnesses:
    ALICE WILSON,
    WILLIAM BODA.